US006864320B2

United States Patent
Ogawa et al.

(10) Patent No.: US 6,864,320 B2
(45) Date of Patent: Mar. 8, 2005

(54) TRANSPARENT OR TRANSLUCENT RESIN COMPOSITION

(75) Inventors: Katsutoshi Ogawa, Yokohama (JP); Kiyoshi Ohtsu, Yokohama (JP); Atsuhiko Mukai, Yokohama (JP)

(73) Assignee: Kawasaki Sanko Kasei Co., Ltd., Kanagawa (JP)

(*) Notice: Subject to any disclaimer, the term of this patent is extended or adjusted under 35 U.S.C. 154(b) by 52 days.

(21) Appl. No.: 10/168,831

(22) PCT Filed: Dec. 12, 2000

(86) PCT No.: PCT/JP00/08774

§ 371 (c)(1),
(2), (4) Date: Jun. 25, 2002

(87) PCT Pub. No.: WO01/48082

PCT Pub. Date: Jul. 5, 2001

(65) Prior Publication Data

US 2003/0032730 A1 Feb. 13, 2003

(30) Foreign Application Priority Data

Dec. 28, 1999 (JP) .......................... 11/373250

(51) Int. Cl.⁷ .................. C08F 8/00; C08L 23/00; C08L 23/04; C08L 33/02; C08L 33/04
(52) U.S. Cl. .................. 525/191; 525/221; 525/222; 525/240; 525/241
(58) Field of Search .................. 525/191, 221, 525/222, 240, 241

(56) References Cited

U.S. PATENT DOCUMENTS

| 4,281,084 A | | 7/1981 | Fellmann et al. |
| 4,367,113 A | * | 1/1983 | Karim et al. ............ 156/327 |
| 5,360,281 A | | 11/1994 | Kamen et al. |
| 5,845,575 A | * | 12/1998 | Eda et al. ............ 101/483 |
| 6,132,883 A | * | 10/2000 | McGrath et al. ............ 428/457 |
| 6,372,324 B1 | * | 4/2002 | Fujii et al. ............ 428/141 |

FOREIGN PATENT DOCUMENTS

| JP | 05-93162 | 4/1993 |
| JP | 06-255296 | 9/1994 |
| JP | 07-216178 | 8/1995 |
| JP | 10-101860 | 4/1998 |
| WO | WO 99/54398 | 10/1999 |

* cited by examiner

*Primary Examiner*—Nathan M. Nutter
(74) *Attorney, Agent, or Firm*—Sherman & Shalloway

(57) ABSTRACT

There is provided a transparent or semitransparent resin composition which can be easily cut.

The resin composition can be obtained by mixing a methacrylic resin with an ethylene·vinyl acetate copolymer resin, polybutene-1, polypropylene resin, ionomer and low-density polyethylene in a specific ratio.

9 Claims, No Drawings

TRANSPARENT OR TRANSLUCENT RESIN COMPOSITION

DETAILED DESCRIPTION OF THE INVENTION

1. Field of the Invention

The present invention relates to a transparent or semitransparent resin composition and molded articles thereof. More specifically, it relates to a transparent or semitransparent resin composition which is suitable for use as molded articles to be cut with cutlery when in use and which can be cut with cutlery, and to the molded articles.

2. Prior Art

There has been need for the development of plastic materials which can be easily cut with cutlery, like wooden materials. The need has partially been met by techniques such as one in which a plastic is foamed and one in which a large amount of inorganic or organic powders (such as calcium carbonate powders, woodflour, talc powders, etc.) are contained in the plastic. However, all the materials obtained by any of the above techniques are not transparent. A technology for producing plastic molded articles which are transparent and can be cut with cutlery has not been existent.

Meanwhile, there has recently been seen a tendency toward preference of transparent or semitransparent general consumer goods such as personal computers, timepieces, stationery and AV products whose interior parts can be seen from outside. They are generally called "skeleton products". What must be easily cut with cutlery when in use, such as the casings of pencils (particularly color pencils) and pencil type cosmetics, are now desired to be transparent or semitransparent.

PROBLEMS THE INVENTION INTEND TO SOLVE

It is therefore an object of the present invention to provide a novel resin composition which is transparent or semitransparent and can be easily cut with cutlery.

It is another object of the present invention to provide a resin composition which is transparent or semitransparent so that it can be used as molded articles such as the casings of color pencils and pencil type cosmetics and which can be easily cut with cutlery.

It is still another object of the present invention to provide a transparent or semitransparent molded article which is made from the above resin composition of the present invention and can be cut with cutlery.

Other objects and advantages of the present invention will become apparent from the following description.

MEANS FOR SOLVING THE PROBLEM

According to the present invention, firstly, the above objects and advantages of the present invention are attained by a transparent or semitransparent resin composition which comprises (A) 100 parts by weight of a methacrylic resin and (B1) 3 to 100 parts by weight of at least one polymer selected from the group consisting of an ethylene·vinyl acetate copolymer resin and polybutene-1 (may be referred to as "first composition of the present invention" hereinafter).

Secondly, the above objects and advantages of the present invention are attained by a transparent or semitransparent resin composition which comprises (A) 100 parts by weight of a methacrylic resin and (B2) 30 to 300 parts by weight of at least one polymer selected from the group consisting of a polypropylene resin, an ionomer and a low-density polyethylene (may be referred to as "second composition of the present invention" hereinafter).

Thirdly, the above objects and advantages of the present invention are attained by a transparent or semitransparent resin composition which comprises (A) 100 parts by weight of a methacrylic resin, (B1) 3 to 100 parts by weight of at least one polymer selected from the group consisting of an ethylene·vinyl acetate copolymer resin and polybutene-1 and (B2) 30 to 300 parts by weight of at least one polymer selected from the group consisting of a polypropylene resin, an ionomer and a low-density polyethylene.

Finally, the above objects and advantages of the present invention are attained by molded articles made from the above resin compositions of the present invention, which are transparent or semitransparent and can be cut with cutlery.

The resin composition of the present invention is extremely useful as a raw material for the production of molded articles which are transparent or semitransparent and can be cut with cutlery.

PRACTICAL EMBODIMENT OF THE INVENTION

The methacrylic resin used in the present invention is preferably a methacrylic resin itself which is transparent. The methacrylic resin contains a recurring unit derived from methyl methacrylate preferably in an amount of 80 mol % or more based on the total of all the recurring units. The methacrylic resin preferably has a weight average molecular weight of 60,000 to 100,000. The methacrylic resin preferably has transparency with a light transmission, measured in accordance with ASTM D 1003, of 92% or more. The methacrylic resin used in the present invention can be acquired as commercially available products such as Delpet 60N (of Asahi Kasei Kogyo KK.) and Acrypet MD (of Mitsubishi Rayon Co., Ltd.).

The ethylene·vinyl acetate copolymer resin used in the first composition and the third composition of the present invention is preferably an ethylene·vinyl acetate copolymer resin itself which is transparent. The ethylene·vinyl acetate copolymer resin comprises a recurring unit derived from vinyl acetate in an amount of preferably 2 to 35 wt %, more preferably 15 to 20 wt % based on the total of all the recurring units. The ethylene·vinyl acetate copolymer resin is preferably produced by a high-pressure process and has a weight average molecular weight of several ten thousands to several hundred thousands. The ethylene·vinyl acetate copolymer resin has transparency with a light transmission, measured in accordance with ASTM D 1003, of preferably 20% or more, more preferably 30% or more.

The ethylene·vinyl acetate copolymer resin can be acquired as commercially available products such as Evaflex (of Du Pont-Mitsui Polychemicals Co., Ltd.) and Novatec EVA (of Japan Polychem Corp.).

Similarly, the polybutene-1 used in the first composition and the third composition of the present invention is preferably poybutene-1 itself which is transparent. The polybutene-1 is preferably a polymer obtained by polymerizing high-purity butene-1 in the presence of a Ziegler catalyst.

The polybutene-1 can be acquired as commercially available products such as Tafmer (of Mitsui Chemicals, Inc.).

The ethylene·vinyl acetate copolymer resin and polybutene-1 may be used alone or in combination.

The resin and/or polymer are/is used in a total amount of 3 to 100 parts by weight based on 100 parts by weight of the methacrylic resin.

Below 3 parts by weight, the obtained composition has very high transparency but unsatisfactory cuttability. Above 10 parts by weight, the obtained composition is satisfactory in terms of transparency and cuttability but the strength, specifically elastic modulus of its molded article becomes low with the result that it cannot be used as the casing of a pencil because it is easily bent by pressure when writing therewith.

The total amount of the resin and/or polymer is preferably 5 to 90 parts by weight based on the same standard as above.

The polypropylene resin used in the second composition and the third composition of the present invention is preferably a polypropylene resin itself which is transparent or semitransparent. The polypropylene resin is preferably a random copolymer of propylene and ethylene or an α-olefin having 4 or 5 carbon atoms. The amount of ethylene or α-olefin having 4 or 5 carbon atoms copolymerized is preferably 0.5 to 5 mol % based on the total of all the recurring units.

As the transparent or semitransparent polypropylene resin is preferably used what contains a nucleating agent or clarifier because transparency or semitransparency is easily obtained due to the formed microcrystals. The polypropylene resin can be acquired as commercially available products such as Novatec PP MG03B (of Japan Polychem Corp.) and Grand Polypro J226E (of Grand Polymer Co., Ltd.).

The transparent or semitransparent polypropylene resin in the present invention is a polypropylene resin which gives a 2 mm-thick plate having a haze value of 30% or less.

Similarly, the ionomer used in the second composition and the third composition is preferably an ionomer itself which is transparent or semitransparent. As the ionomer is preferably used those obtained by crosslinking copolymers of ethylene and acrylic acid or methacrylic acid each other in the presence of a metal ion such as Zn, Na, Ba or Ca. The amount of the acrylic acid or methacrylic acid copolymerized is preferably 5 to 20 mol % based on the total of all the recurring units.

The ionomer can be acquired as commercially available products such as Himilan (of Du Pont-Mitsui Polychemicals Co., Ltd.).

The transparent or semitransparent ionomer in the present invention is an ionomer which gives a 1 mm-thick plate having a haze value of 6% or less in accordance with JIS K-7105.

Similarly, the low-density polyethylene used in the second composition and the third composition generally has a melting point of 98 to 115° C. and a melt flow rate (ASTM D 1238) of 0.25 to 27 g/10 min, and is produced by a high-pressure process.

The polypropylene resin, ionomer and low-density polyethylene may be used alone or in combination. These polymer components are used in a total amount of 30 to 300 parts by weight based on 100 parts by weight of the acrylic resin. Below 30 parts by weight, the obtained composition is satisfactory in terms of transparency but unsatisfactory in terms of cuttability, while above 300 parts by weight, the obtained composition is unsatisfactory in terms of both transparency and cuttability.

The total amount of the polymer components is preferably 35 to 200 parts by weight based on the same standard as above.

The third composition of the present invention comprises a combination of the ethylene·vinyl acetate copolymer resin and/or polybutene-1 (B1) used in the first composition and the polymer components (B2) used in the second composition.

It can be said that the first composition of the present invention has an extremely high level of transparency close to that of the methacrylic resin alone. Therefore, the first composition is advantageously used for applications which require extremely high transparency and cuttability.

Meanwhile, as the second composition of the present invention shows semitransparency nearly equivalent to a transparent polypropylene resin and a transparent ABS resin, it can be advantageously used for applications which require a high-grade impression due to low transparency.

The third composition of the present invention has an intermediate level of transparency between the transparency of the above first composition and the transparency of the second composition, that is, slightly restrained transparency and excellent cuttability. An example of the third composition is a blend of 50 parts by weight of an ethylene·vinyl acetate copolymer resin and 50 parts by weight of a transparent polypropylene resin with 100 parts by weight of a methacrylic resin.

Since a blend of a methacrylic resin and other five resins has kind of additivity as described above, resins to be blended are selected according to application purpose, design or the taste of a customer to adjust the level of transparency from a perfect level to an intermediate level.

The present inventors have studied how to further improve the appearance and cuttability of molded articles and flowability at the time of molding by a trial and error method and have found that, as required, addition and blend of one or more a hydrogenated styrene-based elastomer, hydrogenated petroleum resin and low-molecular weight polyolefins to a blend of a methacrylic resin and other five resins is effective. The hydrogenated styrene-based elastomer is preferably a styrene-based elastomer obtained by saturating the double bond of a polybutadiene block by hydrogenation. This elastomer is commercially available from Asahi Kasei Kogyo KK. under the trade name of Tuftec. When a slightly thick molded article is formed from a blend of a methacrylic resin and an ethylene·vinyl acetate copolymer resin or polybutene-1, a white flow pattern which seems to be caused by low compatibility may be formed at the center of the molded article. When this elastomer is added in an amount of 1 to 15 parts by weight based on 100 parts by weight of the blend resin, this white flow pattern which is undesired from the viewpoint of appearance can be eliminated without impairing excellent cuttability.

The hydrogenated petroleum resin is preferably partially hydrogenated or completely hydrogenated petroleum resin having a softening point of 90 to 140° C. and an average molecular weight of 700 to 950. It is commercially available from Idemitsu Petrochemical Co., Ltd. under the trade name of IMARV. The hydrogenated petroleum resin is effective in further improving cuttability and increasing flowability. For example, when 1 to 10 parts by weight of this hydrogenated petroleum resin is added to a blend of 100 parts by weight of a methacrylic resin and 80 parts by weight of a transparent polypropylene resin, cuttability and flowability are markedly improved.

The low-molecular weight polyolefin is also called "polyethylene wax" or "polypropylene wax". They are commercially available from Sanyo Chemical Industries, Ltd. under the trade name of Sanwax and Viscol, respectively. The former has a softening point of 100 to 130° C. and an average molecular weight of 1,500 to 6,000 and the latter has a softening point of 145 to 155° C. and an average molecular weight of 3,000 to 15,000.

When 3 to 10 parts by weight of the former polyethylene wax is added to 100 parts by weight of a blend of a methacrylic resin and low-density polyethylene, cuttability and flowability are further improved. When 1 to 10 parts by weight of the latter polypropylene wax is added to 100 parts by weight of a blend of a methacrylic resin and a polypropylene resin, not only cuttability but also transparency and flowability are improved.

To obtain the molded articles of the present invention, additives used for the production and processing of plastics, such as a heat stabilizer, lubricant, antistatic agent and wetting agent are preferably added and used. An antistatic agent is particularly useful because it prevents cuttings from adhering to cutlery due to static electricity.

EXAMPLES

The following examples are provided for the purpose of further illustrating the present invention but are in no way to be taken as limiting.

Examples 1 to 10 and Comparative Examples 1 to 10

Pellets of blend resins were manufactured by varying the blending ratio of a methacrylic resin to other resins as shown in Table 1 to blend them by means of a drum tumbler and melt kneading and extruding the resulting blends under the following extrusion and mix-kneading conditions.

Extrusion and Mix-kneading Conditions

Used extruder: single-screw extruder (vented) having a screw diameter of 40 mm
Screw design: L/D25, compression ratio of 3.5 (gradual compression), cylinder temperature: 210 to 220° C. from the hopper side toward the die, revolution speed of screw: 80 rpm After the thus obtained pellets were dried at 90° C. for 2 hours as described above, molded articles called "multi-layered color plate" having a width of 5 cm and a length of 9 cm and consisting of a 1-mm thick layer, a 2 mm-thick layer and a 3 mm-thick layer were formed under the following injection molding conditions.

Injection Molding Conditions

Used molding machine: J40S having a clamping force of 40 tons of Nippon Steel Co., Ltd.
Cylinder temperature: 200 to 220° C. from the hopper side toward the front end
Used mold: selecting only one of the above color plates
Molding cycle: 30 to 35 seconds The evaluation for transparency and cuttability was carried out as follows, using the obtained molded color plates. That is, as for transparency, commercially available red and blue color pencil leads were placed on the back side of each plate, the color leads were seen through the plate, and how clearly the color leads could be seen was judged by comparing the obtained color plate with a color plate of a methacrylic resin having the highest transparency (trade name: Delpet 60N) and a semitransparent color plate of a transparent polypropylene resin (trade name: Novatec PP MG03B) which was a little hazy. The transparency of the former was ranked 10, that of the latter was ranked 5, and the interval between them was divided into four grades. The transparency of each color plate of a blend resin was judged with naked eyes and ranked. The transparency of each plate was expressed by an average value of rankings made by five people.

As for cuttability, the color plate and a commercially available color pencil having a wooden casing (trade name: MITSUBISHI HARD 7700) were cut with a knife, and the cuttability of the color pencil was ranked 5. When the cuttability of the color plate was higher than the color pencil, the cuttability of the color plate was expressed by a figure larger than 5 and when it was lower than the color pencil, the cuttability was expressed by a figure smaller than 5. The cuttability was expressed by an average value of rankings made by five people. The results are shown in Table 2.

TABLE 1

| | Resin to be blended with A | amount of resin (based on 100 parts by weight of A) | third component and its amount (based on 100 parts by weight of the total of resins) |
|---|---|---|---|
| | | (parts by weight) | (parts by weight) |
| C. Ex. 1 | B | 20 | 1 part of G and 1 part of J |
| Ex. 1 | B | 80 | 2 parts of G and 2 pars of J |
| Ex. 2 | B | 200 | 3 parts of G and 3 pars of J |
| C. Ex. 2 | B | 330 | 4 parts of G and 4 pars of J |
| C. Ex. 3 | C | 2 | 1 part of G |
| Ex. 3 | C | 15 | 2 parts of G |
| Ex. 4 | C | 70 | 3 parts of G |
| C. Ex. 4 | C | 130 | 4 parts of G |
| C. Ex. 5 | D | 2 | 1 part of G |
| Ex. 5 | D | 15 | 2 parts of G |
| Ex. 6 | D | 70 | 3 parts of G |
| C. Ex. 6 | D | 130 | 3 parts of G |
| C. Ex. 7 | E | 20 | 1 part of G and 1 part of H |
| Ex. 7 | E | 80 | 2 parts of G and 2 pars of H |
| Ex. 8 | E | 200 | 3 parts of G and 3 pars of H |
| C. Ex. 8 | E | 330 | 4 parts of G and 4 pars of H |
| C. Ex. 9 | F | 20 | same as above |
| Ex. 9 | F | 80 | same as above |
| Ex. 10 | F | 200 | same as above |
| C. Ex. 10 | F | 330 | same as above |

Ex.: Example
C. Ex.: Comparative Example
(notes)
A methacrylic resin: Delpet 60N of Asahi Chemical Industry Co., Ltd.
B polypropylene resin: Novatec PP MG03B of Japan Polychem Corp.
C ethylene-vinyl acetate copolymer resin: Evaflex EV360 of Du Pont-Mitsui Polychemicals Co., Ltd.
D polybutene-1: Tafmer P-0680J of Mitsui Chemicals, Inc.
E ionomer: Himilan 1652 of Du Pont-Mitsui Polychemicals Co., Ltd.
F low-density polyethylene resin: Suntec M6520 of Asahi Chemical Industry Co., Ltd.
G hydrogenated styrene-based elastomer: Tuftec H1052 of Asahi Chemical Industry Co., Ltd.
H polyethylene wax: Sanwax LEL-800 of Sanyo Chemical Industries, Ltd.
I polypropylene wax: Viscol 330-P of Sanyo Chemical Industries, Ltd.
J hydrogenated petroleum resin: IMARV P-140 of Idemitsu Petrochemical Co., Ltd.

TABLE 2

| Experiment No. | transparency | cuttability | acceptability |
|---|---|---|---|
| C. Ex. 1 | 3 | 2 | Not accepted |
| Ex. 1 | 5 | 4 | Accepted |
| Ex. 2 | 4 | 5 | Accepted |
| C. Ex. 2 | 2 | 3 | Not accepted |
| C. Ex. 3 | 8 | 3 | Not accepted |
| Ex. 3 | 8 | 5 | Accepted |
| Ex. 4 | 8 | 6 | Accepted |
| C. Ex. 4 | 8 | 4 | Not accepted: unusable because it is too soft |
| C. Ex. 5 | 8 | 3 | Not accepted |
| Ex. 5 | 8 | 5 | Accepted |

TABLE 2-continued

| Experiment No. | transparency | cuttability | acceptability |
|---|---|---|---|
| Ex. 6 | 8 | 6 | Accepted |
| C. Ex. 6 | 8 | 4 | Not accepted: unusable because it is too soft |
| C. Ex. 7 | 2 | 3 | Not accepted |
| Ex. 7 | 5 | 4 | Accepted |
| Ex. 8 | 4 | 5 | Accepted |
| C. Ex. 8 | 3 | 2 | Not accepted |
| C. Ex. 9 | 3 | 2 | Not accepted |
| Ex. 9 | 4 | 5 | Accepted |
| Ex. 10 | 4 | 4 | Accepted |
| C. Ex. 10 | 2 | 3 | Not accepted |

Ex.: Example
C. Ex.: Comparative Example
(notes)
Acceptability: When both transparency and cuttability are not ranked 4 or more, it is judged that the plate is not usable as a molded article which is practically transparent or semitransparent and can be cut.

When the above results are seen, molded articles made from a blend of an ethylene·vinyl acetate copolymer resin and polybutene-1 resin are excellent in terms of transparency. Meanwhile, it is understood that cuttability equivalent to that of pencils having a wooden casing can be obtained for any type of resin by optimizing the blending ratio. It is also understood that when the components are blended in a ratio outside the ratio specified by the present invention, a molded article having both transparency and cuttability cannot be obtained. These results are for injection molded articles and that the same results are obtained for extrusion molded articles is obvious from Examples 13 and 14 below which show that pipe-like molded products shape having size approximately equal to pencil are extruded to be molded and the extrusion molded articles are equivalent to injection molded articles in terms of appearance, transparency and cuttability.

Examples 11 and 12

Amounts shown below of the resins and additives were blended together by a drum tumbler for 5 minutes.
Composition of Example 11
  4.0 kg of transparent polypropylene resin (Novatec PP MG03B of Japan Polychem Corp.)
  6.0 kg of methacrylic resin (Delpet 60N of Asahi Chemical Industry Co., Ltd.)
  0.3 kg of hydrogenated styrene-based elastomer (Tuftec H1052 of Asahi Chemical Industry Co., Ltd.)
  0.05 kg of zinc stearate
  0.03 kg of antistatic agent (Rikemal S-100 of Riken Vitamin Co., Ltd.)
Composition of Example 12
  3.0 kg of ethylene·vinyl acetate copolymer resin (Evaflex EV360 of Du Pont-Mitsui Polychemicals Co., Ltd.)
  7.0 kg of methacrylic acid (same as above)
  0.3 kg of hydrogenated styrene-based elastomer (same as above)
  0.05 kg of zinc stearate
  0.03 kg of antistatic agent (same as above)
The obtained above two blends were dried at 90° C. for 3 hours, melt kneaded and extruded under the following conditions to obtain pellets of the blends.
Kneading and Extrusion Conditions
  Used extruder: single screw with a screw diameter of 30 mm, an L/D of 28 and a compression ratio of 2.8, fitted with a strand die at the front end (die hole diameter of 3.5 mm)
  Temperature: C1; 200° C., C2; 210° C., C3; 220° C., die; 220° C.
  Revolution speed of screw: 70 rpm
These two pellets were dried at 90° C. for 3 hours and injection molded under the following conditions to obtain pipe-like molded products having an outer diameter of 7 mm, an inner diameter of 4 mm and a length of 110 mm.
Injection Molding Conditions
  Used molding machine: J40S with a clamping force of 40 tons of Nippon Steel Co., Ltd.
  Cylinder temperature: 200-220° C. from the hopper side toward the front end
  Used mold: one-cavity mold for pipe-like molded products, normal mold temperature
  Molding cycle: 28 seconds
Each one end of the obtained two molded products were firmly sealed up with Sellotape, a red lipstick commercially available from Shiseido Co., Ltd. was molten by heating and poured into the hollow portions of the pipes. As for the thus obtained pencil type cosmetic products having a transparent casing, it was confirmed that these samples were apparently so-called skeleton products that the red lipstick material contained therein could be seen clearly through the transparent casing. The product of Example 11 was excellent in transparency from the aspect that its interior could be clearly seen as the casing material was nearly completely transparent, but it looked rather cheap because the interior could be seen too well. On the other hand, the product of Example 12 was semitransparent rather than transparent but had a preferred appearance because it looked expensive.

As for cuttability, when they were cut with a commercially available cutter for cutting pencil type cosmetics, held with fingers, it was found that they were equivalent to existing similar products having a wooden casing and that cuttings were connected, thereby rarely causing scattering of the cuttings.

Meanwhile, as this type of pipe-like molded products are often formed by extrusion molding, the following experiments were conducted to confirm that the present invention would exhibit a satisfactory effect even in this case.

Examples 13 and 14

Dry pellets of the same two blends as used in Examples 11 and 12 were extrusion molded under the following conditions to obtain pipe-like molded products having almost the same outer diameter and inner diameter as in Examples 11 and 12.
Extrusion Molding Conditions:
  used molding machine: screw diameter; 30 mm, L/D; 25, compression ratio; 2.5
  cylinder temperature; C1; 190° C., C2; 200° C., C3; 210° C.
  die shape and temperature; ejection port having an outer diameter of 7.5 mm and an inner diameter of 4.5 mm, 205° C.
  revolution speed of screw: 40 rpm
  forming system: diameter control method
  take-off speed: 7 m/min
The obtained pipe-like molded products were cut to a length of 110 mm and a red lipstick material was filled in the hollow portions of the pipes as described above. The obtained products had completely the same appearance and almost the same cuttability as the above injection molded products.

Effect of the Invention

Pencil type cosmetics and color pencils obtained from a transparent or semitransparent molded product having cuttability obtained by the present invention are products used in daily life, can meet the demand of the times for skeleton products whose interior can be seen and have a great industrial added value.

What is claimed is:

1. A transparent or semitransparent resin composition comprising (A) 100 parts by weight of a methacrylic resin, (B1) 3 to 100 parts by weight of an ethylene·vinyl acetate copolymer resin and 1 to 15 parts by weight, based on 100 parts by weight of (A) and (B1), of a hydrogenated styrene-based elastomer.

2. A transparent or semitransparent resin composition comprising (A) 100 parts by weight of a methacrylic resin, (B2) 30 to 300 parts by weight of a polypropylene resin and (C) 1 to 15 parts by weight, based on 100 parts by weight of (A) and (B2), of a hydrogenated styrene-based elastomer.

3. A transparent or semitransparent resin composition comprising (A) 100 parts by weight of a methacrylic resin, (B1) 3 to 100 parts by weight of an ethylene·vinyl acetate copolyrner resin, (B2) 30 to 300 parts by weight of a polypropylene resin and (C) 1 to 15 parts by weight, based on 100 parts by weight of (A), (B1) and (B2), of a hydrogenated styrene-based elastomer.

4. A transparent or semitransparent molded article which comprises a resin composition comprising (A) 100 parts by weight of a methacrylic resin, (B1) 3 to 100 parts by weight of an ethylene·vinyl acetate copolymer resin and 1 to 15 parts by weight, based on 100 parts by weight of (A) and (B1), of a hydrogenated styrene-based elastomer.

5. A transparent or semitransparent molded article which comprises a resin composition comprising (A) 100 parts by weight of a methacrylic resin, (B2) 30 to 300 parts by weight of a polypropylene resin and (C) 1 to 15 parts by weight, based on 100 parts by weight of (A) and (B2), of a hydrogenated styrene-based elastomer.

6. A transparent or semitransparent molded article which comprises a resin composition comprising (A) 100 parts by weight of a methacrylic resin, (B1) 3 to 100 parts by weight of an ethylene·vinyl acetate copolymer resin, (B2) 30 to 300 parts by weight of a polypropylene resin and (C) 1 to 15 parts by weight, based on 100 parts by weight of (A), (B1) and (B2), of a hydrogenated styrene-based elastomer.

7. The molded article of claim 4 which is a pencil or pencil type cosmetic product.

8. The molded article of claim 5 which is a pencil or pencil type cosmetic product.

9. The molded article of claim 6 which is a pencil or pencil type cosmetic product.

* * * * *